United States Patent
Kohle

[11] Patent Number: 6,129,121
[45] Date of Patent: Oct. 10, 2000

[54] PIPE NIPPLE

[75] Inventor: Michael R. Kohle, San Luis, Calif.

[73] Assignee: Zurn Industries, Inc., Erie, Pa.

[21] Appl. No.: 09/181,364

[22] Filed: Oct. 28, 1998

[51] Int. Cl.[7] .................................................. F16L 9/14
[52] U.S. Cl. ..................... 138/143; 138/141; 138/140; 285/55
[58] Field of Search ................... 138/114, 113, 138/143, 141, 137; 285/55, 45

[56] References Cited

U.S. PATENT DOCUMENTS

| | | | |
|---|---|---|---|
| 2,486,871 | 11/1949 | Osterheld | 204/197 |
| 2,806,718 | 9/1957 | Cook et al. | 285/55 |
| 2,925,097 | 2/1960 | Duesterberg | 138/64 |
| 2,943,967 | 7/1960 | Simon | 154/83 |
| 2,998,984 | 9/1961 | Gressel | 285/55 |
| 3,093,161 | 6/1963 | Jacobson | 138/143 |
| 3,097,668 | 7/1963 | Langer | 138/145 |
| 3,137,066 | 6/1964 | Merino et al. | 29/474.4 |
| 3,143,364 | 8/1964 | Klein | 285/55 |
| 3,260,661 | 7/1966 | Kemp et al. | 204/148 |
| 3,614,137 | 10/1971 | Jacobson | 285/390 |
| 3,718,571 | 2/1973 | Bidwell | 204/197 |
| 3,726,548 | 4/1973 | Alewitz | 285/249 |
| 3,753,888 | 8/1973 | Alewitz | 204/197 |
| 3,891,530 | 6/1975 | Alewitz | 204/197 |
| 3,893,719 | 7/1975 | Eidelberg et al. | 285/55 |
| 3,916,954 | 11/1975 | Hochhausen | 138/149 |
| 3,953,311 | 4/1976 | Wasson | 204/197 |
| 4,060,472 | 11/1977 | Alewitz | 204/197 |
| 4,079,966 | 3/1978 | Berry et al. | 285/24 |
| 4,083,583 | 4/1978 | Volgstadt et al. | 285/55 |
| 4,171,254 | 10/1979 | Koenecke | 204/197 |
| 4,195,197 | 3/1980 | Kurr et al. | 174/78 |
| 4,248,460 | 2/1981 | Murray et al. | 285/363 |
| 4,345,785 | 8/1982 | Bradford | 285/50 |
| 4,370,211 | 1/1983 | Hybler | 204/148 |
| 4,400,019 | 8/1983 | Fruck | 285/55 |
| 4,487,230 | 12/1984 | Anthony | 138/103 |
| 4,496,444 | 1/1985 | Bagnulo | 204/197 X |
| 4,507,842 | 4/1985 | Werner | 29/451 |
| 4,513,995 | 4/1985 | Niehaus et al. | 285/55 |
| 4,688,828 | 8/1987 | Shaffer | 285/45 |
| 4,855,029 | 8/1989 | Gazda et al. | 204/197 |
| 4,954,172 | 9/1990 | Houle et al. | 204/197 |
| 4,954,233 | 9/1990 | Houle et al. | 204/197 |
| 5,023,928 | 6/1991 | Houle et al. | 204/197 X |
| 5,131,688 | 7/1992 | Tricini | 285/53 |
| 5,164,058 | 11/1992 | Dressel et al. | 204/196 |
| 5,169,180 | 12/1992 | Villoni et al. | 285/55 X |
| 5,423,631 | 6/1995 | Inoue | 405/211 |

*Primary Examiner*—Patrick Brinson
*Attorney, Agent, or Firm*—Webb Ziesenheim Logsdon Orkin & Hanson, P.C.

[57] ABSTRACT

A pipe nipple used in fluid heating, fluid cooling and air conditioning systems, the pipe nipple having a dielectric body and a continuous layer of electrically conductive material attached to the exterior surface of the body.

16 Claims, 1 Drawing Sheet

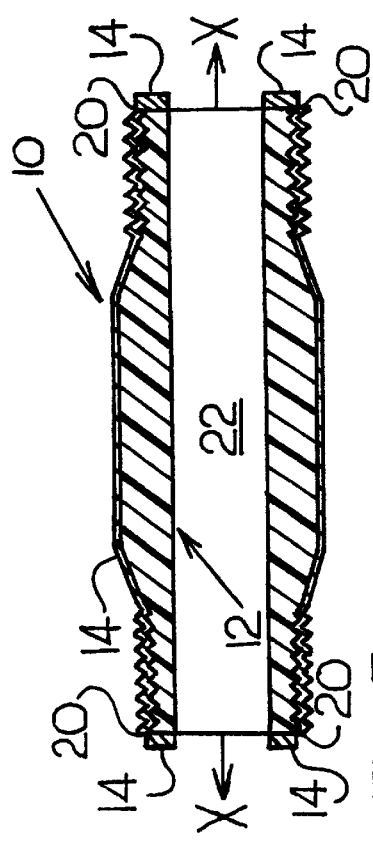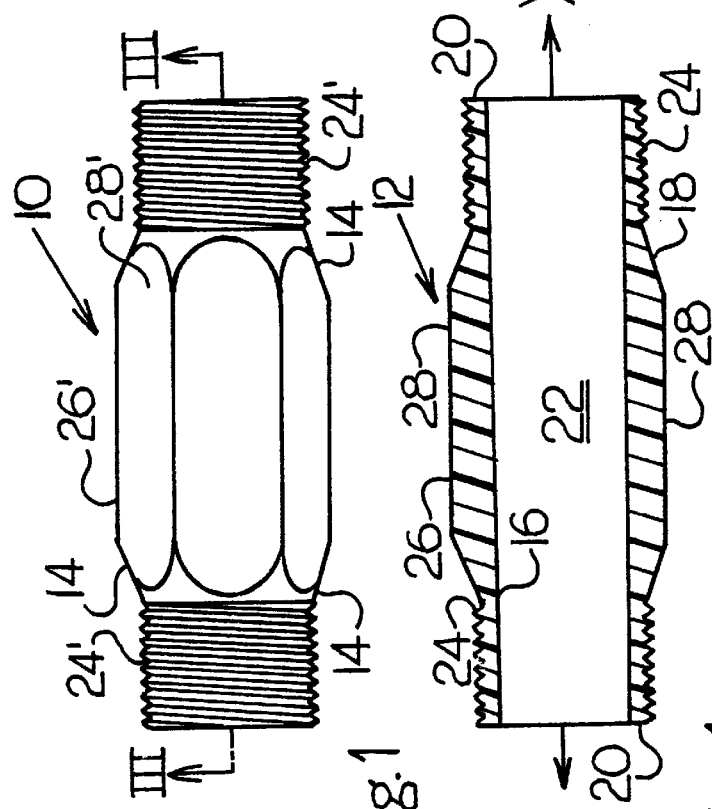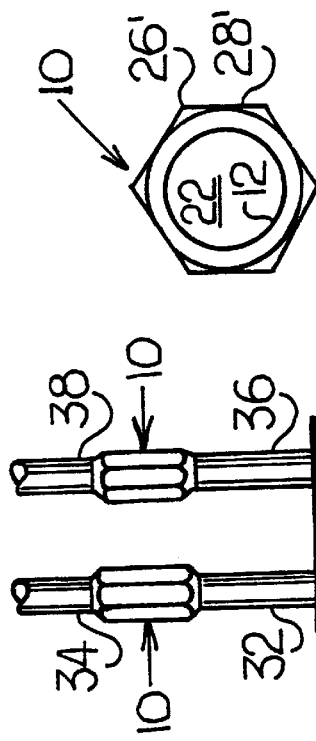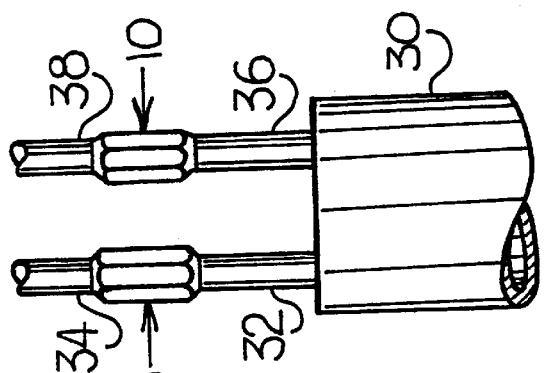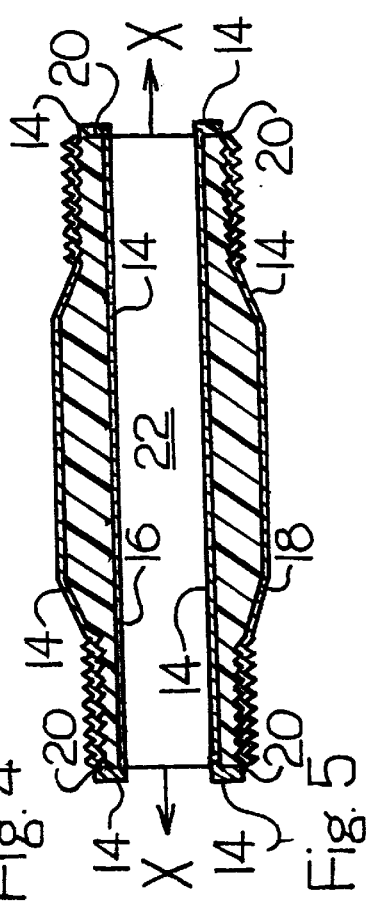

PIPE NIPPLE

BACKGROUND OF THE INVENTION

1. Field of the Invention

The present invention relates to pipe nipples and, more particularly, to pipe nipples used in fluid heating, fluid cooling, and fluid ventilation systems.

2. Description of the Prior Art

Pipe nipples are commonly used to connect two or more pipe segments to one another. In water heating systems, metal pipe nipples can be lined with non-corrosive materials to help retard electrolytic corrosion caused by the metal pipe nipple's exposure to water and oxygen. For example, U.S. Pat. No. 3,093,161 to Jacobson discloses a lined pipe nipple for use in hot water heating systems. The pipe nipple includes a metal body with a plastic insert. The insert prevents the metal body from being exposed to water and eventually corroding. Such an arrangement is expensive to manufacture because two separate components, the metal body and the plastic insert, must be manufactured and then attached to each other. Moreover, expansion and contraction of the separate components increases the potential for water to penetrate between the metal body and the plastic insert, thus reducing the electrolytic corrosion protection.

While plastic inserts may help protect the interior of a pipe nipple from electrolytic corrosion, the plastic inserts do not protect the pipe nipple or the attached piping from galvanic corrosion. Galvanic corrosion can occur when different metals are connected together. In the case of water heating systems, the metal used to construct the water supply pipe and the water return pipe is often different than the metal used to construct the water heater's inlet pipe, outlet pipe, and holding tank. Therefore, the possibility of galvanic corrosion exists.

A non-metallic, electrically non-conductive material can be used to overcome electrolytic and galvanic corrosion. For example, U.S. Pat. No. 4,345,785 to Bradford discloses a polytetrafluoroethylene annular washer positioned between two pipes made of dissimilar metals. The polytetrafluoroethylene washer, commercially sold under the trademark TEFLON, physically separates the pipes, thereby eliminating galvanic corrosion.

In water heating systems, however, another function of the water supply pipe or the water return pipe is to provide an electrical ground for the water heater. If plastic pipe nipples are used to connect a water supply pipe and a water return pipe to a water heater's inlet pipe and outlet pipe, respectively, the electrical grounds between the water heater and the water supply pipe and the water heater and the water return pipe are interrupted.

Therefore, it is an object of the present invention to provide a pipe nipple that can be used in fluid heating systems, fluid cooling systems, and fluid ventilation systems, such as HVAC, which is inexpensive to manufacture.

SUMMARY OF THE INVENTION

The present invention is a pipe nipple having a body formed from an electrically non-conductive material and a continuous layer of electrically conductive material attached to the body.

The body has an interior surface, an exterior surface, and two opposing ends. The interior surface of the body defines a passageway that extends along a longitudinal axis and the exterior surface defines two connection segments, wherein each connection segment is positioned adjacent a corresponding opposing end. A wrench fitting is positioned between the two connection segments. The wrench fitting is preferably hexagonally shaped, having six rectangularly-shaped flat surfaces positioned about the longitudinal axis of the body, adjacent to one another, forming a six-sided ring shape around the longitudinal axis of the body.

The continuous layer of electrically conductive material is attached to the body, preferably connecting one opposing end of the body to the other opposing end of the body.

The pipe nipple is manufactured by forming a body from a dielectric material, such as electrically non-conductive plastic. A continuous layer of electrically conductive material, such as nickel, chrome, tin or zinc, is then attached to the body by electroplating, selective electroplating, vapor deposition or other suitable methods. Electrically conductive material attached to the interior surface of the body, if any, is then selectively removed by mechanical, chemical, or other suitable methods to further inhibit electrolytic corrosion.

The pipe nipple is installed between two segments of pipe, preferably between a water heater inlet pipe and a water supply pipe, or between a water heater outlet pipe and a water return pipe. Threaded connections are preferred to ensure that the electrically conductive material is in physical contact with pipes adjacent to the pipe nipple.

The dielectric material of the body resists electrolytic corrosion, creates an electrical insulator between dissimilar metals, and further electrically insulates between the continuous layer of electrically conductive material attached to the body and the passageway extending through the body. Simultaneously, the continuous layer of electrically conductive material attached to the body, extending from one connection segment on the body to the other connection segment on the body, provides an electrical grounding pathway for the water heater.

BRIEF DESCRIPTION OF THE DRAWINGS

FIG. 1 is a side elevational view of a pipe nipple made in accordance with the present invention;

FIG. 2 is a front elevational view of the pipe nipple shown in FIG. 2;

FIG. 3 is a sectional view of the pipe nipple shown in FIG. 1, taken along line III—III;

FIG. 4 is a sectional view of a pipe nipple body;

FIG. 5 is a section view of a pipe nipple body with a continuous layer of an electrically conductive material attached to the body; and FIG. 6 is a side elevational view of the pipe nipple shown in FIG. 1, connecting a water heater inlet pipe to a water supply pipe and a water heater outlet pipe to a water return pipe.

DETAILED DESCRIPTION OF THE PREFERRED EMBODIMENT

FIGS. 1–3 show a pipe nipple 10 made in accordance with the present invention. The pipe nipple 10 includes an electrically non-conductive body 12 and a continuous layer of an electrically conductive material 14 attached to the body 12. As shown in FIGS. 1–3, and with greater detail in FIG. 4, the body 12 has an interior surface 16, an exterior surface 18, and two opposing ends 20. The interior surface 16 defines a passageway 22 extending therethrough, the passageway 22 extending along a longitudinal axis x. The exterior surface 18 of the body 12 forms two connection segments 24, preferably externally threaded, positioned adjacent to a corresponding opposing end 20, and defines a wrench fitting 26 positioned between the two connection segments 24. The wrench fitting 26 has a plurality of flat surfaces 28, preferably six rectangularly-shaped flat surfaces, positioned adjacent to one another, and positioned about the longitudinal axis x of the body, forming a hexagonal ring shape about the longitudinal axis x of the body 12. While a hexagonal ring shape is preferred, the wrench fitting 26 can have any number of flat surfaces 28 or no flat surfaces.

The body 12 is formed from an electrically non-conductive or dielectric material preferably having a thickness range of approximately 0.080 to 0.272 inches. NORYL GFN3 plastic is able to withstand the standard heat and pressures encountered in water heating applications, preferably in the range of 33 to 180 degrees Fahrenheit and 15 to 300 psi, and is the preferred electrically non-conductive material used to form the body 12.

The continuous layer of electrically conductive material 14, such as a metal, is attached to the body 12. Most preferrably the electrically conductive material is chrome, but nickel, tin, or zinc are also preferrable. In the preferred embodiment, the continuous layer of electrically conductive material 14 is only attached to the exterior surface 18 of the body 12 and the opposing ends 20 of the body 12. Attachment of the electrically conductive material 14 to the interior surface 16 of the body 12 is also permissible provided that a layer of electrically conductive material 14 does not continuously extend from one opposing end 20 of the body 12 to the other opposing end 20 of the body.

Preferably, the thickness of the continuous layer of electrically conductive material 14 is 75–150$\mu$ inches (microinches). The continuous layer of electrically conductive material 14 is sufficiently thin so that the profile of the exterior surface 18 of the body 12 is also the profile of the attached continuous layer of electrically conductive material 14, namely, the connection segments 24, the wrench fitting 26, and the flat surfaces 28, designated by prime numbers 24', 26', and 28', respectively. Moreover, the continuous layer of electrically conductive material 14 is sufficiently thin that it has a negligible effect on the strength of the body 12, including the tensile strength and the strength of the body 12 to contain a pressurized fluid.

Direct contact between the exterior surface 18 of the body 12 and the continuous layer of electrically conductive material 14 is preferred, so that the body 12 and continuous layer of electrically conductive material 14 form one single piece. However, other methods of positioning the continuous layer of electrically conductive material 14 adjacent to the exterior surface 18 of body 12 may be used. For example, the continuous layer of electrically conductive material 14 can be partially embedded into the exterior surface 18 of the body 12, affixed to the exterior surface 18 of the body 12 with glue, adhesive, rivets, or otherwise attached in any manner which prevents fluid from reaching between the body 12 and the continuous layer of electrically conductive material 14.

As shown in FIG. 4, the pipe nipple 10 is manufactured by first forming the body 12 from a dielectric material, preferably NORYL GFN3 plastic, such as by molding. The continuous layer of electrically conductive material 14 is then deposited directly onto the surfaces of the body 12 through electroplating, selective electroplating, vapor deposition, or other suitable methods, with electroplating being the preferred method. As an example of electroplating, an electroless copper strike is connected to the body 12 and a chrome plate is positioned adjacent the body 12 in a manner well-known in the art. As shown in FIG. 5, chrome deposits on the surfaces 16, 18, 20 of the body, creating a continuous layer of electrically conductive material 14.

Selective electroplating is similar to electroplating, except that portions of the body 12, including the opposing ends 20 of the body 12, are masked with covers to prevent the attachment of electrically conductive material 14 on the interior surface 16 of the body 12 or on selected exterior surfaces 18 of the body 12.

In vapor deposition, the body 12 is placed in a sealed vessel with the electrically conductive material 14. The air in the vessel is then evacuated, forming a vacuum within the vessel. The continuous layer of electrically conductive material 14 is then heated into a vapor, and the vapor fills the vessel. As shown in FIG. 5, the vapor attaches itself to the interior surface 16, exterior surface 18, and opposing ends 20 of the body 12 as it returns to a solid state. As with selective electroplating, masking may be used to prevent attachment of electrically conductive material 14 to the interior surface 16 or selected exterior surfaces 18 of the body 12.

Depending on the method used to attach the layer of electrically conductive material 14 to the body 12, the interior surface 16 of the body 12 is cleaned by mechanical, chemical or other suitable means, selectively removing electrically conductive material 14 attached to the body 12, preferably from the interior surface 16 of said body 12. Conductive material on opposing ends 20 may also be removed. Selective removal of the continuous layer of electrically conductive material 14 from the interior surface 16 of the body 12 encompasses complete removal or partial removal of the continuous layer of electrically conductive material 14. Partial removal, unlike complete removal, does not remove all of the electrially conductive material 14 attached to the interior surface 16 or exterior surface 18 of the body 12.

The electrically conductive material 14 is preferably left undisturbed on the exterior surface 18 of the body 12 during selective removal of electrically conductive material from the interior surface 16 of the body 12, but selective removal of the electrically conductive material 14 from the exterior surface 18 of the body 12 can also be accomplished, provided that a continuous layer of electrically conductive material 14, extending from one connection segment 24 of the body 12 to the other connection segment 24 of the body 12, remains undisturbed. The continuous layer of conductive material 14 can be in any configuration that positions the continuous layer of conductive material 14 on the exterior surface 18 of the body 12 and on both connection segments 24. When selective removal has been completed, the pipe nipple 10 is complete.

FIG. 6 shows two pipe nipples 10, made in accordance with the present invention, in fluid communication with a water heater 30. In general, one connection segment 24 on each body 12 of each pipe nipple 10 is individually connected to a water heater pipe 32, 36 and the other connection segment 24 on each body 12 of each pipe nipple 10 is individually connected to a respective water pipe 34, 38. The pipe nipples 10 threadedly connect a hot water heater inlet pipe 32 to a water supply pipe 34 and a water heater outlet pipe 36 to a water return pipe 38, respectfully. Threaded connections are preferred because the continuous layer of electrically conductive material 14 attached to the exterior surface 18 of the body 12 is in physical contact with the adjacent pipes 32, 34, 36, 38. This contact ensures electrical grounding conductivity between the water heater inlet pipe 32 and the water supply pipe 34 and between the water heater outlet pipe 36 and the water return pipe 38. While two pipe nipples 10 are shown in FIG. 6, one pipe nipple 10 attached between the water heater inlet pipe 32 and the water supply pipe 34 may be used or, conversely, a plurality of pipe nipples 10 may be used if the water heater 30 has a plurality of water heater pipes 32, 36 connected to the water heater 30 in fluid communication with a plurality of respective water pipes 34, 38.

As water travels through the passageway 22 extending through the body 12 of the pipe nipple 10, the dielectric material of the body 12 electrically insulates the water in the passageway 22 from the electrical grounding pathway created by the continuous layer of electrically conductive material 14 attached to the exterior surface 18 of the body 12. Further, the dielectric material of the body 12 resists electrolytic corrosion and electrically insulates two dissimilar metal pipes from one another.

Therefore, the present invention provides a pipe nipple 10 that is inexpensive to manufacture and suitable for use in fluid heating systems, fluid cooling systems, fluid ventilation systems, HVAC, or other applications. The body 12 of the pipe nipple 10 is formed from a dielectric material, so the body 12 is immune from electrolytic corrosion and simultaneously retards galvanic corrosion. The continuous layer of electrically conductive material 14, preferably attached to the exterior surface 18 of the body 12, provides an electrical grounding pathway for a water heater 30.

The invention has been described with reference to the preferred embodiment. Obvious modifications and alterations will occur to others upon reading and understanding the preceding detailed description. It is intended that the invention be construed as including all such modifications and alterations and so far as they come within the scope of the appended claims or the equivalents thereof.

I claim:

1. A pipe nipple comprising:
   a body formed from an electrically non-conductive material, said body having an interior surface, an exterior surface, and two opposing ends, said interior surface defining a passageway extending therethrough along a longitudinal axis and said exterior surface forming two connection segments and a wrench fitting, said connection segments are each positioned adjacent to a corresponding opposing end and said wrench fitting having a plurality of surfaces positioned adjacent to one another about the longitudinal axis of said body; and
   a continuous layer of an electrically conductive material attached to said body, wherein said continuous layer of electrically conductive material is positioned adjacent to said exterior surface of said body, extending from one connection segment of said body to said other connection segment of said body.

2. The pipe nipple as claimed in claim 1, wherein said electrically non-conductive material is plastic.

3. The pipe nipple as claimed in claim 1, wherein said electrically conductive material is metal.

4. The pipe nipple as claimed in claim 3, wherein said metal is a metal selected from the group consisting of chrome, nickel, tin and zinc.

5. The pipe nipple as claimed in claim 1 wherein said continuous layer of an electrically conductive material is only attached to said exterior surface.

6. A pipe nipple comprising:
   a body formed from an electrically non-conductive plastic, said body having an interior surface, an exterior surface, and two opposing ends, said interior surface defining a passageway extending therethrough along a longitudinal axis and said exterior surface forming two connection segments and a wrench fitting, said connection segments each having external threads and each positioned adjacent to a corresponding opposing end, said wrench fitting having a plurality of flat surfaces positioned adjacent one another and positioned about the longitudinal axis of said body; and
   a continuous layer of an electrically conductive material attached to said body, wherein said continuous layer of electrically conductive material is positioned adjacent to said exterior surface of said body, extending from one said connection segment of said body to said other connection segment of said body.

7. The pipe nipple as claimed in claim 6, wherein said electrically conductive material is metal.

8. The pipe nipple as claimed in claim 7, wherein said metal is a metal selected from the group consisting of chrome, nickel, tin and zinc.

9. The pipe nipple as claimed in claim 6, wherein said wrench fitting has six rectangularly-shaped flat surfaces forming a hexagonal ring shape.

10. A water heating system comprising:
    a water heater;
    a plurality of water heater pipes connected to said water heater;
    a pipe nipple having an electrically non-conductive body and a continuous layer of electrically conductive material, said body having an interior surface, an exterior surface, and two opposing ends, said interior surface defining a passageway extending therethrough along a longitudinal axis, said exterior surface defining a wrench fitting having a plurality of flat surfaces positioned about said longitudinal axis of said body, adjacent to one another, forming a hexagonal-shaped ring about the longitudinal axis of said body, said exterior surface also forming two connection segments, each of said connection segments positioned adjacent to a corresponding opposing end, wherein said continuous layer of electrically conductive material is only attached to said exterior surface of said body, extending from one of said connection segments of said body to said other connection segment of said body, and one connection segment on said body of said pipe nipple is connected to one of said water heater pipes; and
    a plurality of water pipes in fluid communication with said plurality of water heater pipes, respectively, wherein one water pipe is threadedly connected to said other connection segment of said body.

11. The water heating system of claim 10, wherein said non-conductive material is plastic.

12. The water heating system as claimed in claim 10, wherein said electrically conductive material is metal.

13. The water heating system as claimed in claim 12, wherein said metal is a metal selected from the group consisting of chrome, nickel, tin or zinc.

14. The water heating system as claimed in claim 10, wherein said connection segment has external threads.

15. The pipe nipple as claimed in claim 1, wherein said surfaces positioned adjacent to one another about the longitudinal axis of said body are flat.

16. The pipe nipple as claimed in claim 1, wherein said surfaces positioned adjacent to one another about the longitudinal axis of said body form a hexagonal-shaped ring about the longitudinal axis of said body.

* * * * *